United States Patent
Geislinger et al.

(10) Patent No.: US 8,689,951 B2
(45) Date of Patent: Apr. 8, 2014

(54) TORSIONAL VIBRATION DAMPER

(75) Inventors: Matthias Geislinger, Salzburg (AT); Cornelius Geislinger, Salzburg (AT); Christian Huber, Hallwang (AT)

(73) Assignee: Ellergon Antriebstechnik Gesellschaft m.b.H., Hallwang (AT)

( * ) Notice: Subject to any disclaimer, the term of this patent is extended or adjusted under 35 U.S.C. 154(b) by 433 days.

(21) Appl. No.: 12/652,193

(22) Filed: Jan. 5, 2010

(65) Prior Publication Data

US 2010/0171247 A1   Jul. 8, 2010

(30) Foreign Application Priority Data

Jan. 7, 2009   (DE) .......................... 10 2009 004 252

(51) Int. Cl.
*F16F 9/30* (2006.01)
(52) U.S. Cl.
USPC ..................................... 188/268; 267/140.13
(58) Field of Classification Search
USPC ................. 267/140.13; 464/24, 84, 100, 101; 29/896.93, 896.91, 896.9, 557
See application file for complete search history.

(56) References Cited

U.S. PATENT DOCUMENTS

| 3,996,767 | A | * | 12/1976 | Geislinger | ....................... 464/82 |
| 4,104,891 | A | | 8/1978 | Geislinger | |
| 5,364,308 | A | * | 11/1994 | Vollet | ............................... 464/82 |
| 6,238,294 | B1 | | 5/2001 | Martinek | |
| 7,025,681 | B2 | * | 4/2006 | Geislinger | .................... 464/100 |
| 2003/0078084 | A1 | * | 4/2003 | Geislinger | .................... 460/100 |
| 2010/0171248 | A1 | * | 7/2010 | Geislinger et al. | ....... 267/140.13 |

FOREIGN PATENT DOCUMENTS

| DE | 749197 | 1/1945 |
| DE | 1222324 | 8/1966 |
| DE | 2444787 | 4/1975 |
| DE | 2818295 | 10/1979 |
| DE | 19734726 | 9/1998 |
| DE | 19839470 | 3/1999 |
| EP | 0955484 | 11/1999 |

* cited by examiner

*Primary Examiner* — Robert A Siconolfi
*Assistant Examiner* — Mahbubur Rashid
(74) *Attorney, Agent, or Firm* — Myers Wolin, LLC

(57) ABSTRACT

A torsional vibration damper comprises an outer housing, an inner part that is concentric relative to the outer housing, a plurality of chambers formed between the outer housing and the inner part, which are filled with a damping medium and are connected to one another through overflow channels, and a plurality of leaf spring assemblies that are arranged in the chambers and join the outer housing and the inner part with one another in a torsionally flexible manner. The leaf spring assemblies have machining-induced deflections. Two leaf springs with substantially similar deflections are each arranged within a chamber. The leaf spring pairs may be arranged in a mirror-image array or in parallel to one another. Thus, the manufacturing cost of a torsional vibration damper can be reduced, while its compact outer dimensions can be maintained.

3 Claims, 4 Drawing Sheets

TORSIONAL VIBRATION DAMPER

Figure 1:
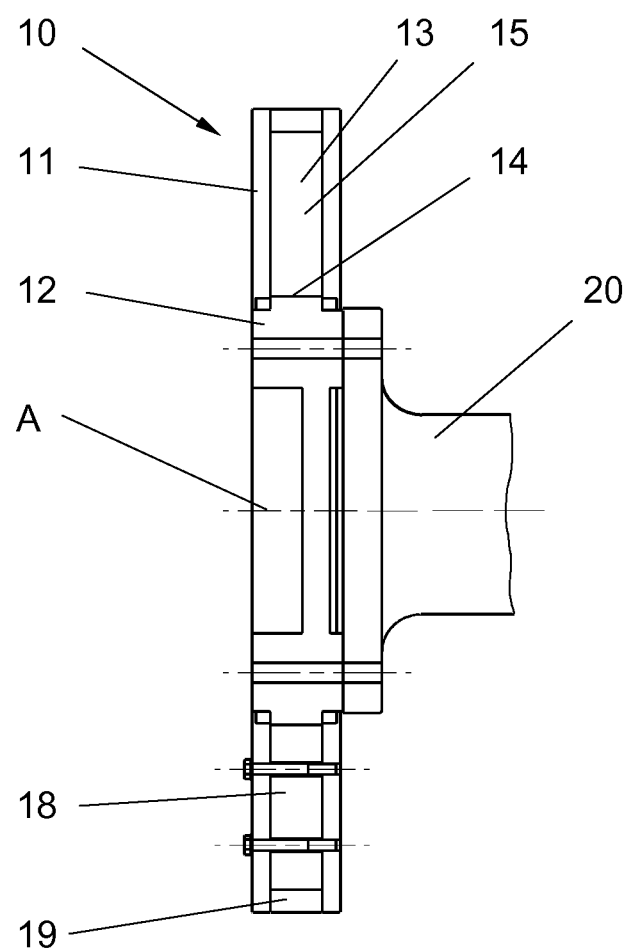

This application claims priority under 35 USC §119 to German Patent Application No. 10 2009 004 252.0, filed Jan. 7, 2009, which is incorporated herein by reference in its entirety.

The present invention relates to a torsional vibration damper, comprising an outer housing, an inner part that is concentric relative to the outer housing, a plurality of chambers formed between the outer housing and the inner part, which are filled with a damping medium and are connected to one another through overflow channels, and a plurality of leaf spring assemblies that are arranged in the chambers and join the outer housing and the inner part with one another in a torsionally flexible manner.

Torque transmission between the inner part and the outer housing is carried out flexibly by means of the leaf spring assemblies. With a relative rotation between the inner part and the outer housing, the displacement of the damping medium between the outer housing and the inner part causes a damping effect.

Such torsional vibration dampers are used primarily in large two-stroke and four-stroke diesel engines and gas engines for counteracting the torsional vibrations in the power train. The torsional vibration damper, whose outer diameter can be up to three meters, is, for example, flanged to the crankshaft of the engine. However, torsional vibration dampers of the type mentioned above can also be used on other rotating parts such as camshafts, intermediate shafts and axle drive shafts, as well as gearboxes. Such torsional vibration dampers are known from U.S. Pat. Nos. 3,996,767 A and 6,238,294 B1.

In practice, the production of the leaf spring assemblies is difficult as their flexural behavior must be adapted to the desired purpose of application. Typically, this requires machining in order to produce a wedge-shaped tapering of the leaf springs towards the inner part, as described in U.S. Pat. No. 6,238,294 B1. Due to material properties, such machining causes a distortion of the component, which after removal from its set-up fixture emerges in the form of a deflection. This deflection is difficult to predict and must be removed with considerable effort, as the use of deformed leaf springs would adversely affect the characteristic curve especially around the initial position of the damper under no-load conditions.

The machining-induced deflections of the leaf springs can be explained in the following. Spring steel, the type of steel used for leaf springs, is produced in a rolling process and is straightened afterwards. The rolling process causes compressive stress within the spring steel. In the straightening process this compressive stress is superposed with compressive and/or tensile stresses. After manufacturing a wedge-like tapering of the leaf springs through machining internal stresses are released causing the leaf springs to distort into unpredictable directions depending on the previously effected straightening. This manufacturing-induced distortion has led to a high rate of rejection.

Against this drawback the present invention aims at reducing the manufacturing cost and effort of the above mentioned torsional vibration damper while maintaining compact outer dimensions.

In order to overcome the shortcomings inherent to the prior art the present invention provides a torsional vibration damper, comprising an outer housing, an inner part that is concentric relative to the outer housing, a plurality of chambers formed between the outer housing and the inner part, which are filled with a damping medium and are connected to one another through overflow channels, and a plurality of leaf spring assemblies, each having one or more leaf springs, which are arranged in the chambers and join the outer housing and the inner part in a torsionally flexible manner, wherein the leaf springs of the leaf spring assemblies have machining-induced deflections and pairs of two leaf spring assemblies with substantially identical deflections are each arranged in one chamber.

In a surprisingly simple manner the present invention enables the use of leaf springs having distortions in the form of machining-induced deflections. The costly and time-consuming straightening of the leaf springs is thus no longer necessary. Moreover, even leaf springs, which would be waste material in a conventional design, can be used.

Thus, the manufacturing process can be simplified significantly without affecting the functionality of the damper. According to the present invention, machining-induced distortion of the leaf springs is allowed, which can be different for each leaf spring. However, the leaf springs are arranged in such a manner that distortion only becomes obvious in a static torsion of the outer part relative to the inner part. This static torsion does not affect the functionality of the torsional vibration damper. According to the invention, the only relevant property, the mean prestress of all spring pairs to be maintained, can be maintained in this simple manner.

In an advantageous embodiment leaf spring assemblies with similar deflections create a greater pre-stress when arranged in a mirror-image array within the first chambers, while an opposing mirror-image arrangement of leaf springs within adjacent secondary chambers creates a minor prestress of the leaf springs. Regarding the damper as a whole, the different prestresses of the leaf springs counterbalance each other to one dimension, as opposed to merely an arrangement of leaf springs without deflections. This results in a very homogenous behavior of the damper flexibility depending on the relative rotation between the inner part and the outer housing.

According to an advantageous embodiment of the invention two leaf spring assemblies having substantially identical deflections are supported by a groove formed on the inner part along a circumferential direction of the inner part.

Preferably, the leaf spring assemblies are spaced apart from each other up to their contact edges on the outer housing, so that they are able to deflect without making contact with each other.

Initially, the leaf springs of the leaf springs can be machined in a simple conventional manner by means of the removal of material. By subsequent measuring of the deflection, appropriate groups of leaf spring with commensurate and equidirectional deflections can be formed. The selected groups of leaf springs can then be assembled afterwards into a damper.

The above mentioned object is accomplished further with a torsional vibration damper comprising an outer housing, an inner part that is concentric relative to the outer housing, a plurality of chambers formed between the outer housing and the inner part, which are filled with a damping medium and are connected to one another through overflow channels, and a plurality of leaf spring assemblies, each having at least one leaf spring, which are arranged in the chambers and join the outer housing and the inner part in a torsionally flexible manner, wherein the leaf springs of the leaf spring assemblies have machining-induced deflections and pairs of two leaf spring assemblies with substantially identical deflections are each arranged in parallel to one another within one chamber.

As in the solution suggested above leaf springs with machining-induced deflections are used here as well. By arranging leaf springs with substantially identical deflections in parallel, an uncontrolled prestress within the leaf spring pairs is avoided and thus a continuous behavior of the flexibility of the damper around an initial position of the damper under no-load conditions is assured. There is a certain displacement of the rotational angle according to the deflections between the fixations of the leaf springs on the outer housing and the inner part. However, this does not in any way affect the characteristic curve of the damper.

Further advantageous embodiments are indicated in the claims.

In an advantageous embodiment, two leaf spring assemblies having substantially identical deflections are supported by a groove formed on the inner part along a circumferential direction of the inner part. This enables repeated loads on the springs and thus a better utilization of material in comparison to alternating loads. In cases where the required displacement of the single leaf springs is very high, one or more spacers between the springs of a leaf spring pair may extend the way of the tips of the leaf springs.

By individually modifying the support on the outer housing and/or the inner part it is possible to ensure that in a damper under no-load conditions all leaf springs of the damper are similarly loaded, i.e. that they have the same prestress or that at least they bear against a flank of the groove with zero-clearance.

Figure 2:
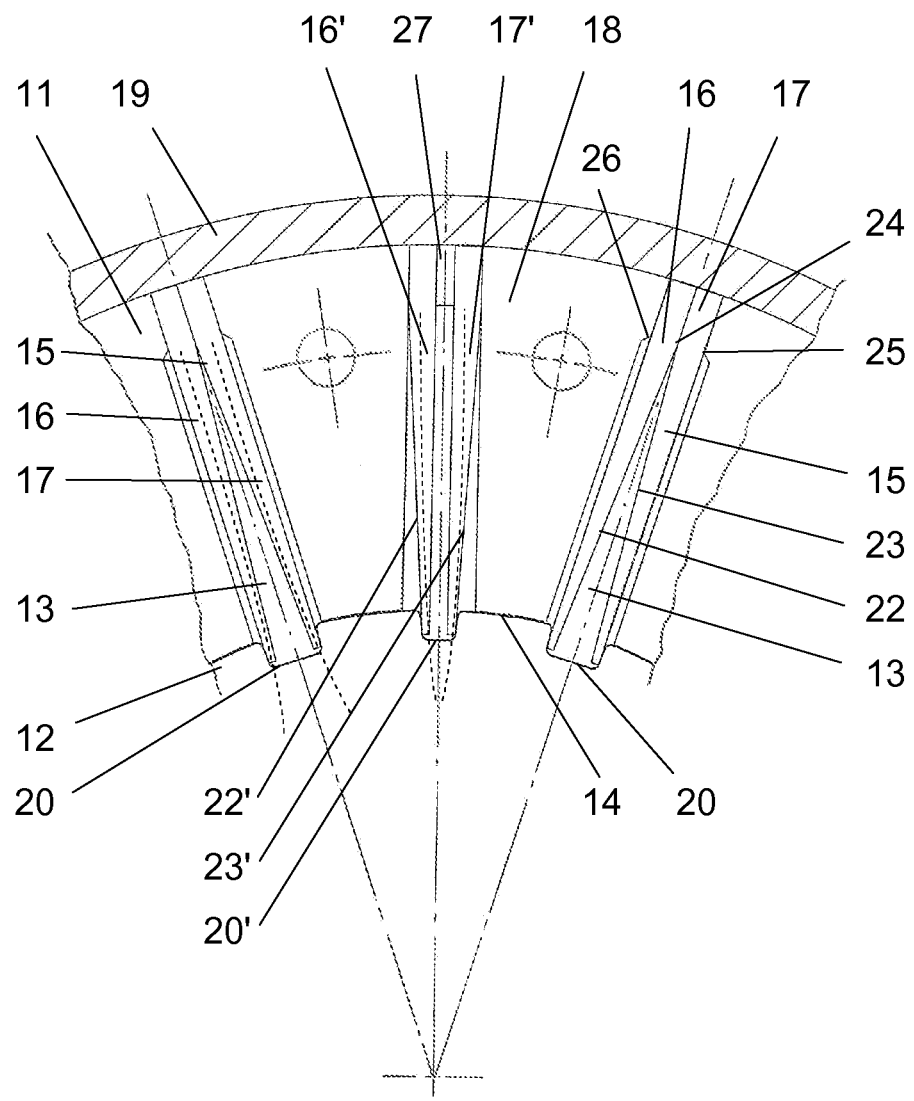
Figure 3:
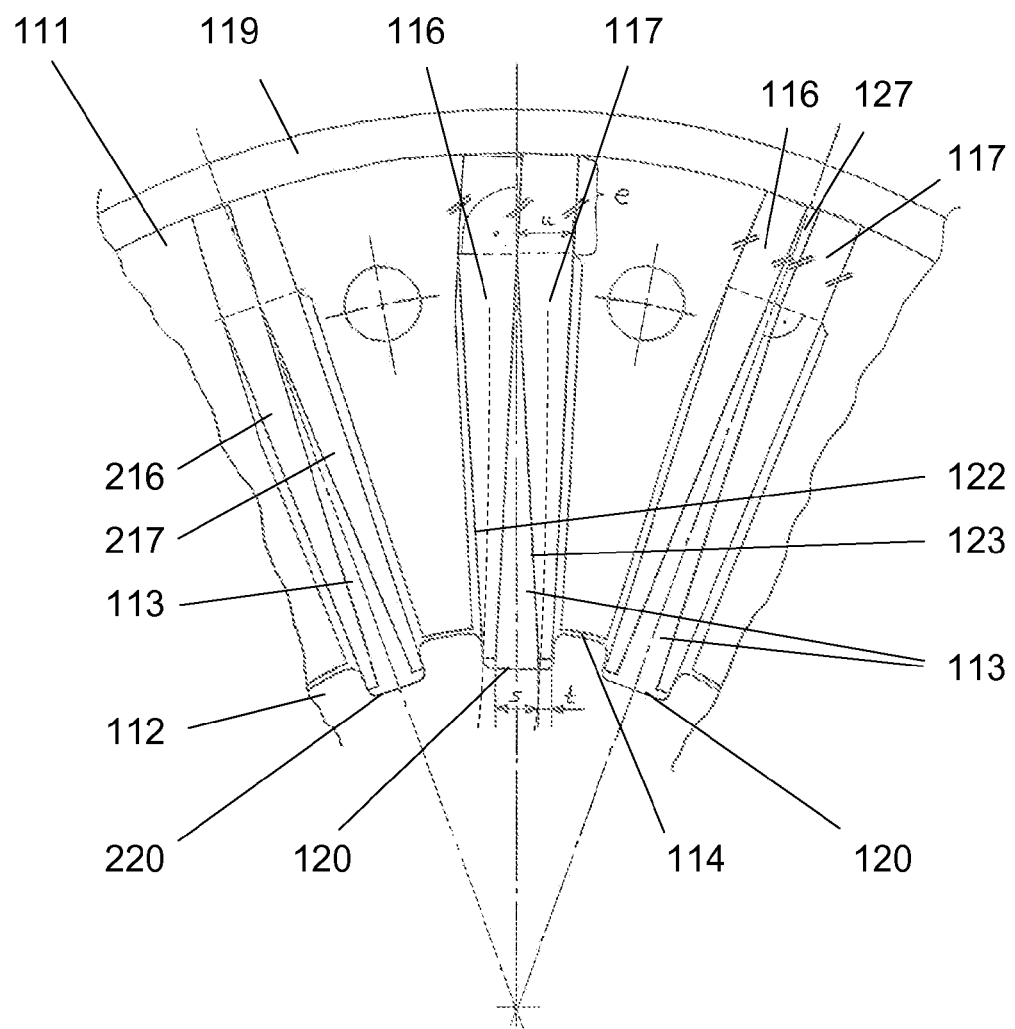
Figure 4:
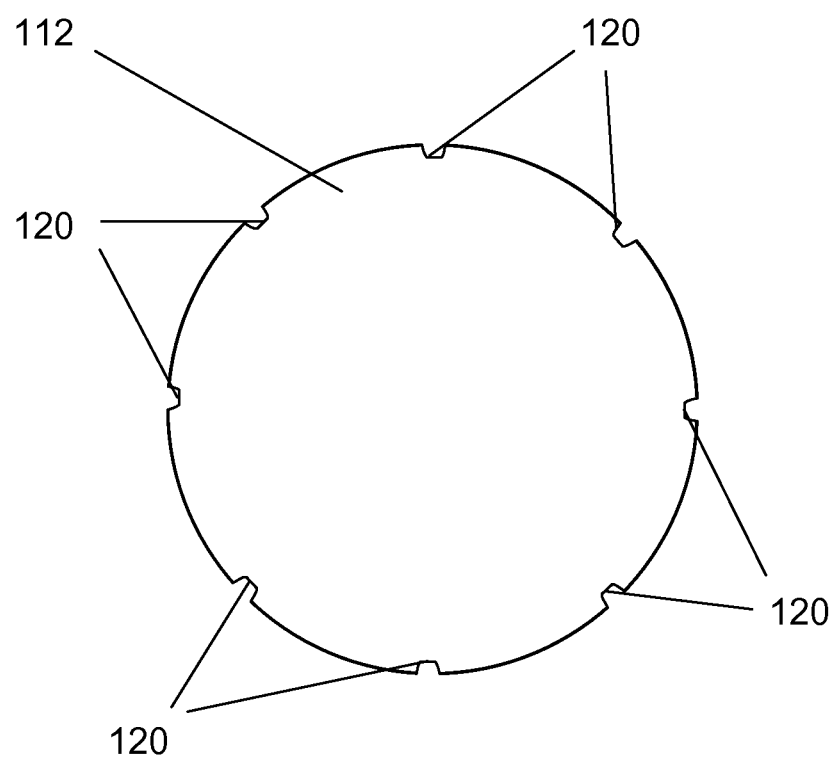

The following detailed description of the present invention will be given with the help of the exemplary embodiments shown in the accompanying drawing. The drawing illustrates in:

FIG. 1 a schematic longitudinal sectional view of a torsional vibration damper according to a first exemplary embodiment, FIG. 2 a sectional view of the torsional vibration damper of FIG. 1, FIG. 3 a sectional view of a torsional vibration damper illustrating three additional exemplary embodiments, and FIG. 4 a cross-sectional view of the inner part of one of the embodiments of a torsional vibration damper shown in FIG. 3.

FIGS. 1 and 2 show a torsional vibration damper 10, which can be coupled to a rotating component 20, such as a crankshaft. The torsional vibration damper 10 includes an outer housing 11 extending along the longitudinal axis A as well as an inner part 12 that is concentric relative to the outer housing 11. The outer housing 11 and the inner part 12 delimit a plurality of separate chambers 13, which are filled with a damping medium, such as pressurized oil. The chambers 13 are arranged in sequence in a circumferential direction and connected to one another through overflow channels 14. The overflow channels 14 are formed by gaps between the inner circumferential sections of the outer housing 11 and the outer circumferential sections of the inner part 12. In the chambers 13, there are torque-transmitting leaf spring assemblies 15, which join the outer housing 11 and the inner part 12 in a torsionally flexible manner, so that the outer housing 11 can be rotated in a certain angular range relative to the inner part 12. With such a relative rotation, a deformation of the leaf spring assemblies 15 and a displacement of the damping medium through the overflow channels 14 can occur, resulting in a damping effect.

The leaf spring assemblies 15 are shown more detailed in FIG. 2. Each leaf spring assembly 15 comprises two leaf springs 16 and 17 made out of spring steel, that are fixed to the outer housing 11 on an end portion. In the exemplary embodiment shown, the leaf springs 16 and 17 are held between intermediate pieces 18 which separate the chambers 13 and are fixed by means of a tightening ring 19. The leaf springs 16 and 17 each extend with their free ends towards a groove 20 formed on the outer circumference of the inner part 12, which forms two opposing flanks in a circumferential direction. In the middle position in a damper under no load conditions shown in FIG. 2, the leaf springs 16 and 17 are held each against one of the flanks of the groove 20 with a defined prestressing force. In any case, in the middle position the leaf springs 16 and 17 bear against one of the flanks of the groove with zero-clearance. Between the free ends of the leaf springs 16 and 17, a free space 21 is left in order for the leaf springs 16 and 17 to be able to deflect in a non-contacting way.

The leaf springs 16 and 17 each show a machining-induced deflection leading to a heightened or reduced prestress of the spring pair 16, 17 within the groove 20 as compared to leaf springs without distortions or deflections. These deflections inevitably result from the manufacturing process of the spring steel and the subsequent machining of the leaf springs 16 and 17 by the removal of material. According to the invention, two leaf springs 16 and 17 with substantially equidirectional deflections are each arranged in a mirror-image array within a chamber 13. In the exemplary embodiment shown, each of the leaf springs 16 and 17 of a leaf spring pair has a machined wedge-shaped surface 22 or 23, so that the leaf springs 16 and 17 taper from their respective contact edges 24 as well as the corresponding contact edges 25 and 26 on the outer housing 11 or the intermediate pieces 18 towards the inner part 12. Here, the wedge-shaped surfaces 22 and 23 are directed towards each other. The leaf springs 16 and 17 may also be implemented as double wedge types.

The leaf springs 16 and 17 of first leaf spring pairs show deflections being directed away from each other in the direction of the inner part 12. FIG. 2 further shows second leaf spring pairs with leaf springs 16' and 17' having deflections directed towards each other in a direction of their inner part ends and being arranged alternately to the first leaf spring pairs 16, 17, so that in a damper 10 there is the same number of first and second leaf spring pairs 16, 17 and 16', 17'. In the second leaf spring pairs 16', 17' the wedge-shaped surfaces 22' and 23' are located on sides directed away from each other. In order keep the free ends of the leaf springs 16' and 17' from contacting each other due to the deflection and from rubbing against each other during operation, the outer housing ends of the leaf springs 16' and 17' are spaced apart by one or more inserts 27. In principle, corresponding inserts 27 may also be provided between the leaf springs 16 and 17 of the first leaf spring pairs.

Due to their manufacturing-induced deflections, the leaf springs 16 and 17 or 16' and 17', respectively, cause greater or lower prestresses within the grooves 20 and 20'. Leaf springs with similar deflections create a greater prestress, for example, by arranging the leaf springs 16 and 17 in a mirror-image array within one chamber, whereas an opposing mirror-image arrangement within the adjacent chamber creates a minor prestress of the leaf springs 16', 17'. Regarding the damper as a whole, the different prestresses of the leaf springs counterbalance each other to the same dimension, as opposed to an arrangement with leaf springs without deflections. This results in a very homogenous behavior of the flexibilities of the damper depending on the relative rotation between the inner part and the outer housing. Straightening of the leaf springs 16 and 17 or 16' and 17', respectively, is not required.

In FIGS. 3 and 4, three additional exemplary embodiments of a torsional vibration damper are shown, which has the same structure as the torsional vibration damper of the first exemplary embodiment with regard to the outer housing 111, the inner part 112, the chambers 113 and the overflow channels 114 as well as the functionality of the leaf spring assemblies. Here too, leaf springs 116 and 117 or 216 and 217, respectively, out of spring steel are used, having machining-induced deflections. However, in this additional exemplary embodiment two leaf springs 116 and 117 and 216 and 217, respectively, with substantially the same deflection are each arranged in parallel within a chamber 113, with their equidirectional deflection tendencies not creating an increase or reduction of the desired prestress of the spring pairs within the grooves 120 and 220.

In the exemplary embodiment shown in FIG. 3—center and FIG. 4, two leaf springs 116 and 117 are supported by a groove 120 formed in an inner part 112 in a circumferential direction of the inner part 112. The leaf springs 116 and 117 are fixed on the outer housing 111 by means of a tightening ring 119 and taper towards the inner part 112. Here, the machined wedge-shaped surfaces 122 and 123 face towards the same direction. All grooves 120 on the inner part 112 have the same groove width (see FIG. 4). Moreover, the receiving parts on the outer housing 111 for all leaf spring assemblies are of the same type. In order to allow for all leaf springs 116 or 117 to be stressed in the best possible way, the leaf springs 116 and 117 are optimized and correspondingly machined referring to the dimensions shown in FIG. 3—center, that is the width u of the leaf springs on their outer housing ends and the width t of the leaf springs on their inner part ends. Here, the fixing surfaces of each leaf spring 116 and 117 on the outer housing 111 with a fixing length e are parallel to each other, resulting in low production costs and minimal usage of material for the single leaf springs 116 and 117.

In a variation of the exemplary embodiment shown in FIG. 3—center, it is possible to further influence the distance of the outer housing ends of the leaf springs by the arrangement of inserts 127 (FIG. 3—right-hand). Moreover, by means of the fixing length e of the leaf springs 116 and 117 on the outer housing 111, the optimal utilization of the springs can be adjusted. Preferably, the fixing length e is the same for all leaf spring assemblies on the damper and the width of the insert 127 is chosen thus, that the leaf springs 116 and 117 will not contact each other within the groove 120 during their deflection. This results in a repeated load on the springs and thus in a better utilization of the spring tension of the damper.

In an additional embodiment (FIG. 3—left-hand), the parameters u and t as well as the free distance s between the inner part ends of the leaf springs are optimized such that on the one hand the best possible tensional utilization of the springs 216, 217 is achieved, and also the width of the groove 220, s+2×t is adjusted to the smallest possible size. Thus, a space-optimized design is achieved in which a maximum number of leaf springs 216 and 217 can be housed in a damper 10, as well as a maximum moment of inertia of the outer housing 111 per volume use can be reached. However, the production of the components thus becomes more costly, as usually the fixing of the springs on the outer part 111 is no longer parallel resulting in an increased use of material.

The present invention has been disclosed with the help of detailed descriptions of advantageous exemplary embodiments. It is, however, not limited hereupon but comprises all embodiments defined in the accompanying claims.

The invention claimed is:

1. A method of arranging springs in a torsional vibration damper comprising an outer housing, an inner part that is concentric relative to the outer housing, a plurality of chambers formed between the outer housing and the inner part which are filled with a damping medium and are connected to one another through overflow channels, and a plurality of leaf spring assemblies, each having one or more leaf springs, which are arranged in the chambers and join the outer housing and the inner part in a torsionally flexible manner, so that the outer housing can be rotated in a certain angular range relative to the inner part, the method comprising:
    grouping a plurality of leaf springs into pairs of leaf springs having substantially identical deflections, and
    arranging the pairs of leaf springs in the chambers such that each chamber has a pair of leaf springs having substantially identical deflections.

2. The method of claim 1, wherein a first pair of leaf springs in a first chamber are substantially identical to each other a second pair of leaf springs in a second chamber are substantially identical to each other, and the springs of the first pair are not substantially identical to the springs of the second pair.

3. The method of claim 1 wherein the leaf springs of the leaf spring assemblies have machining-induced deflections.

* * * * *